(12) United States Patent
Lalezari

(10) Patent No.: US 6,759,978 B2
(45) Date of Patent: Jul. 6, 2004

(54) CROSS-LINK ANTENNA SYSTEM

(75) Inventor: Farzin Lalezari, Boulder, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 38 days.

(21) Appl. No.: 10/104,806

(22) Filed: Mar. 21, 2002

(65) Prior Publication Data

US 2003/0197637 A1 Oct. 23, 2003

(51) Int. Cl.$^7$ .............................................. H04B 7/185
(52) U.S. Cl. ....................................... 342/354; 342/81
(58) Field of Search .......................... 342/81, 154, 352, 342/354, 372, 373

(56) References Cited

U.S. PATENT DOCUMENTS

| | | | |
|---|---|---|---|
| 4,727,373 A | * | 2/1988 | Hoover ........................ 342/25 |
| 5,194,873 A | | 3/1993 | Sickles, II ................... 342/374 |
| 5,410,321 A | | 4/1995 | Gordon et al. .............. 342/374 |
| 5,694,416 A | | 12/1997 | Johnson ...................... 375/206 |
| 5,717,686 A | * | 2/1998 | Schiavoni ................... 370/321 |
| 5,955,987 A | | 9/1999 | Murphy et al. ........ 342/357.06 |
| 6,020,845 A | * | 2/2000 | Weinberg et al. ........... 342/354 |
| 6,043,779 A | | 3/2000 | Lalezari et al. ............. 342/371 |
| 6,043,788 A | | 3/2000 | Seavey ........................ 343/781 |
| 6,496,682 B2 | * | 12/2002 | Butte et al. ................ 455/12.1 |

* cited by examiner

Primary Examiner—Dao Phan

(57) ABSTRACT

A cross-link antenna system including a plurality of spacecraft in a constellation is provided. Each of the spacecraft includes an antenna. One or more of the antennas has a number of antenna elements that can be controllably energized. Determined or selected phases and amplitudes can be individually applied through phase shifters and amplifiers to the antenna elements. In determining phase values for energizing the antenna elements to provide the receive beam in the direction of the current transmit antenna of one of the spacecraft in the constellation, location information is obtained for the transmit spacecraft and each of the beam receiving spacecraft. Additionally, attitude information for each receive spacecraft is found and location information associated with each of the antenna elements for each receive antenna is obtained. Based on such information, during each time interval in which one of the spacecraft in the constellation is sending a transmit beam, each of the other spacecraft in the constellation controls its receive beam in the direction of the transmit beam.

28 Claims, 5 Drawing Sheets

CROSS-LINK ANTENNA SYSTEM

FIELD OF THE INVENTION

The present invention relates to communications among a plurality of spacecraft using determined receive beams.

BACKGROUND OF THE INVENTION

Differently configured antennas have been developed to achieve desired objectives. In one area of application, antennas have been devised for use with spacecraft that orbit the earth. The orbiting spacecraft using their antennas are able to gather and/or process information, such as data related to events or conditions on the earth's surface.

In one specific class associated with antennas that orbit the earth, there are cross-link antenna systems which have been configured for communication and/or navigation purposes. These cross-link antenna systems include the capability of providing communications among a plurality of spacecraft. A particular type of cross-link system includes global positioning system (GPS) satellites. The GPS is used to provide central calibration of all spacecraft in the particular constellation to the same time reference. In addition, this cross-link system sends a given signal from one spacecraft to all other spacecraft in the constellation to allow dissemination of information to one or more of the spacecraft that is in view of a part of the earth that is of current interest. Known cross-link antenna systems in the GPS constellation use hemispherical patterns in both receive and transmit modes during communications among the satellites of the constellation. Each satellite transmits in a prescribed time bin of 1.5 seconds and all other spacecraft receive this information during that time interval. This scheme has a drawback in that the antennas with the satellites of the GPS have relatively small gain. This limits the data range and more importantly makes this cross-link system susceptible to interference due to poor link margin.

With reference to FIG. 1, the prior art cross-link system is diagrammatically illustrated. The prior art system includes a number of spacecraft and, at any instance in time, one of the spacecraft can be characterized as the transmitting spacecraft 20 and the other spacecraft of the constellation can be characterized as the receiving spacecraft 24a, 24b, 24c, 24d. As schematically represented, the transmitting spacecraft 20 sends a multi-directional transmit beam when it is in its transmit mode. Each of the other spacecraft of the constellation, the receiving spacecraft 24a–24d, is in its receive mode and each generates or outputs a receive beam for receiving the transmit beam, during the time interval that the transmitting spacecraft 20 is in its transmit mode. As also represented schematically, each of the receiving spacecraft 24a–24d generates the same shape or configuration of receive beam, namely, the hemispherical pattern. Further depicted in FIG. 1 is the ever present interference or noise emanating from the earth (E). This noise, which is picked up by the hemispherical patterns of the receive beams of the receiving spacecraft, negatively impacts the transmission being sent by the transmitting spacecraft 20. In accordance with this prior art system, once the transmitting spacecraft 20 has finished with its transmit mode, with the prescribed time bin for that spacecraft ending, another spacecraft in the constellation enters its transmit mode. More specifically, one of the previously identified receiving spacecrafts 24a–24d now becomes the transmitting spacecraft. The other spacecraft including the former transmitting spacecraft are placed in their receive modes to receive the transmit beam from this next transmitting spacecraft during communications, such as establishing the same time reference for each of the spacecraft in the constellation. For each time bin with a different transmitting spacecraft, the same non-configurable beam reception patterns are generated by the receiving satellite that have unwanted results including signal interference and data range limitations.

SUMMARY OF THE INVENTION

In accordance with the present invention, a cross-link system is provided that includes a plurality of spacecraft. Each of the spacecraft has an antenna. One or more of these antennas can point or direct their receive beams in the direction of the transmit beam emanating from the current transmit antenna of the transmit spacecraft. This control of the receive beams improves the link margin due to the increased gain of such currently receiving antennas and their lower sidelobes in the unwanted direction(s). Control over beam direction can be done either adaptively or on a fixed basis.

With respect to the one or more antenna apparatuses, that are part of spacecraft in the constellation, and which can control its receive beam in the direction of the current transmit beam, each such antenna apparatus can include a beam controller, phase shift circuitry, a plurality of low noise amplifiers (LNAs), a number of antenna or radiating elements, a combiner and a receiving radio. The beam controller includes at least one processor involved with outputting signals that control the amplitudes and phases of the antennas elements. The phase shift circuitry preferably includes a number of phase shifters. Each of the different phase shifters electrically communicates with a different one of the LNAs. Each LNA electrically communicates with a particular one of the antenna elements. The control signals from the beam controller enable different signal amplitudes to be individually applied to the antenna elements after amplification by its associated LNA. Each of the phase shifters can be separately activated at different times. Depending on the direction of the receive beam for the antenna of a particular spacecraft, a desirably directed receive beam can be output by that antenna apparatus, namely, in the direction of the transmit beam from the transmit antenna that is currently generating the transmit beam. A combiner signal is developed in the combiner, which is a combination of the signals received using the antenna elements, LNAs and phase shifters due to the generated receive beam. The combiner signal is output to the receiving radio. In one embodiment, the receiving radio is involved with a determination related to the signal-noise ratio (SNR) of the combiner signal. The SNR of the combiner signal is useful in ascertaining a maximum, preferred or desired gain of the receive beam for a particular transmit beam.

Regarding communications involving a spacecraft of the particular constellation when one of them is in a transmit mode and the other spacecraft are in a receive mode, a description is provided related to a communication between the current transmit spacecraft and one of the spacecraft that is receiving the transmit beam from this transmit spacecraft. As can be appreciated, this description also applies to other spacecraft in the constellation that are generating their own receive beams to receive the current transmit beam. This description is also applicable to subsequent transmit beams from other spacecraft in the constellation when they are caused to send a transmit beam during a specified time bin.

Important to controlling a first receive beam associated with a first antenna of a first spacecraft are making determinations related to locations of each of the first receive spacecraft and the first transmit spacecraft that has the first transmit antenna outputting the first transmit beam. Additionally, location information is obtained related to the antenna elements of the first receive antenna.

With regard to the location of the first receive spacecraft, first and second receive values are obtained. Preferably, the first and second receive values are angle related. In one embodiment, the first receive value relates to a first angle in one plane, such as the elevation plane. The second receive value relates to a second angle in the azimuth plane. First and second attitude values are also obtained related to the attitude of the first receive spacecraft. The first attitude value relates to one attitude angle in elevation and the other attitude value relates to the attitude of the first receive spacecraft in azimuth. As is well known, the attitude of a spacecraft involves three axes, namely, yaw, pitch and roll axes. In one embodiment, only the yaw axis in each of the elevation and azimuth planes is taken into account in obtaining the first and second attitude values. In such an embodiment, the impact or significance of attitude in the pitch and roll axes is sufficiently small to be ignored.

Using such location information based on elevation, azimuth and attitude angles for the first receive spacecraft and elevation and azimuth angles for the first transmit spacecraft, first and second steering angles can be determined, which can be identified as Phi ($\Phi$) and Theta ($\Theta$). These first and second steering angles ($\Phi$ and $\Theta$)) are utilized with location information of the antenna elements to determine, for each of the antenna elements of the first receive antenna, phase information that can be used in energizing the antenna elements to generate the desired first receive beam. In one embodiment, the antenna element location information that is utilized includes both distance and angle information. In the case of a first receive antenna, a first distance is obtained related to a distance that the first antenna element is located from the center of the array of the antenna elements for the first antenna. In one embodiment, the angle information relates to the angle defined by the first antenna element relative to the center of the antenna element array. In an even more specific embodiment, the number of antenna elements is seven. One of the seven antenna elements is positioned in the center of the antenna element array and the other six antenna elements are disposed radially outwardly from the center antenna element, whereby each of the six antenna elements is angularly equally spaced from its adjacent antenna element by 60°.

The phase information for each antenna element in the array can be determined using the same first and second steering angles, while also using the different angle information and the same or different distance information associated with each of the antenna elements. With respect to amplitude control, in one embodiment, the amplification factor associated with each of the LNAs is the same. The amplitude control signal from the beam controller can be selected or determined so that the amplitude associated with each antenna element is close to, but does not result in, a saturated antenna element signal. After obtaining the phases and the amplitudes for each of the antenna elements (e.g., seven antenna elements), a first receive beam for the first receive antenna can be generated by energizing the antenna elements according to such phase and amplitude values.

In a preferred embodiment, instead of utilizing only the set made up of these determined phases and amplitudes, variants of them are calculated. Such variant values can be a percentage or predetermined magnitude of the previously determined phase and amplitude values. Substantial numbers of different combinations of variant phase values and variant amplitude values are obtained, such as and by way of example five different variants for each antenna element on each of the positive and negative sides of the determined or selected phases and amplitudes. Each variant is used in a process that involves generating receive beams based on one or more variants. Using each such generated receive beam, the combiner develops a combiner signal. The combiner signal is representative of the vectorial sum of the antenna element signals and can be used by the receiving radio to evaluate the SNR of the combiner signal for the particular receive beam. The SNR of the combiner signal relates to the ratio of the vectorial sum of the fields associated with the antenna elements in the direction of the first transmit spacecraft to the vectorial sum of the fields associated with the antenna elements in a direction of interference. According to this preferred embodiment, it is desired that a receive beam be found that results in the highest or greatest ratio of these two vectorial sums. In one embodiment, this is determined by an analysis of the SNRs for each of the receive beams that are generated using the different variants. Each of the determined SNRs can be evaluated including compared with each other to determine the desired, preferably maximum, SNR for all these different receive beams.

After the phase and amplitude variants have been determined and, along with the previously and initially determined phase values and amplitude values, have been analyzed to determine which thereof provides the maximum, or desired, ratio (e.g., optimum SNR), the phase values and amplitude values that correspond to this ratio can be utilized to generate the first receive beam that is used in gathering information from the transmit beam. These phases and amplitudes constituting the maximum or desired ratio provide the desired or maximum antenna gain in the direction of the transmit spacecraft while providing a null, or substantially close thereto, in a direction of interference for the first antenna.

In another embodiment, in addition to making the determinations and/or selections for the phase values and amplitude values for each of the antenna elements in the direction of the transmit spacecraft, which values are intended to result in the desired or maximum gain for the receive antenna, a second gain determination is made using a fixed location(s) on earth. This second gain determination is different from that made when determining the direction of interference in the previous embodiment where the direction of interference is unknown. The objective is to maximize the ratio of the gain in the direction of the transmit spacecraft to the gain in the direction of the fixed location(s). Essentially, it is desirable that the receive antenna generate a receive beam that provides a null, or substantially a null, in the direction of the fixed location(s). Because each such fixed location is known, a determination can be made of the phases and amplitudes that need to be used in achieving the null or substantial null in each fixed location. In particular, angle information associated with each fixed location, together with the requirement that the combiner output a combiner signal that includes a null in the fixed direction, enables the analysis to be conducted that results in the determined phases and amplitudes that, among other things, provide the null or substantial null in the direction of each fixed location.

In still another embodiment that is related to the embodiment in which it is desired to minimize, or at least reduce, interference in an unknown direction, while achieving a receive antenna gain in the direction of the transmit spacecraft that provides the maximum ratio of the two gains, a further determination is made related to the location of the direction of interference. Since the desired phases and amplitudes were obtained that maximize, or substantially maximize, the ratio of the gains in the direction of the transmit spacecraft and in the direction of interference, such phase and amplitude information can be utilized with the previously defined relationships including the location information associated with the antenna elements, to determine location information for the direction of interference. Since location information is known for the receive spacecraft and the previously determined maximum or desired phase and amplitude values are also known, the location information in the form of angle location information ($\Theta$, $\Phi$) can be found for the previously unknown direction of interference.

Based on the foregoing summary, a number of salient aspects of the cross-link antenna system of the present invention are identified. Receive antenna gain is increased (e.g., greater than 7 dB). A greater rejection of unwanted signals, such as noise or other interference, can be achieved (e.g., greater than 20 dB). This results in an overall gain or improvement of 27 dB or more. The cross-link system is compatible with previous or existing spacecraft that do not include the antenna apparatus of the present invention. That is, spacecraft using the antenna apparatus of the present invention can be in the same constellation as spacecraft that do not have the novel antenna apparatus. Ground interference can be rejected on a pre-programmed or adaptive basis. Hardware changes to previous antenna designs used with cross-link system spacecraft are minimal, namely, insertion of controllable phase shifters and amplifiers in communication with existing antenna elements, together with the use of a combiner, radio receiver and beam controller.

Additional advantages of the present invention will become readily apparent from the following discussion, particularly when taken together with the accompanying drawings.

DETAILED DESCRIPTION

Figure 1:
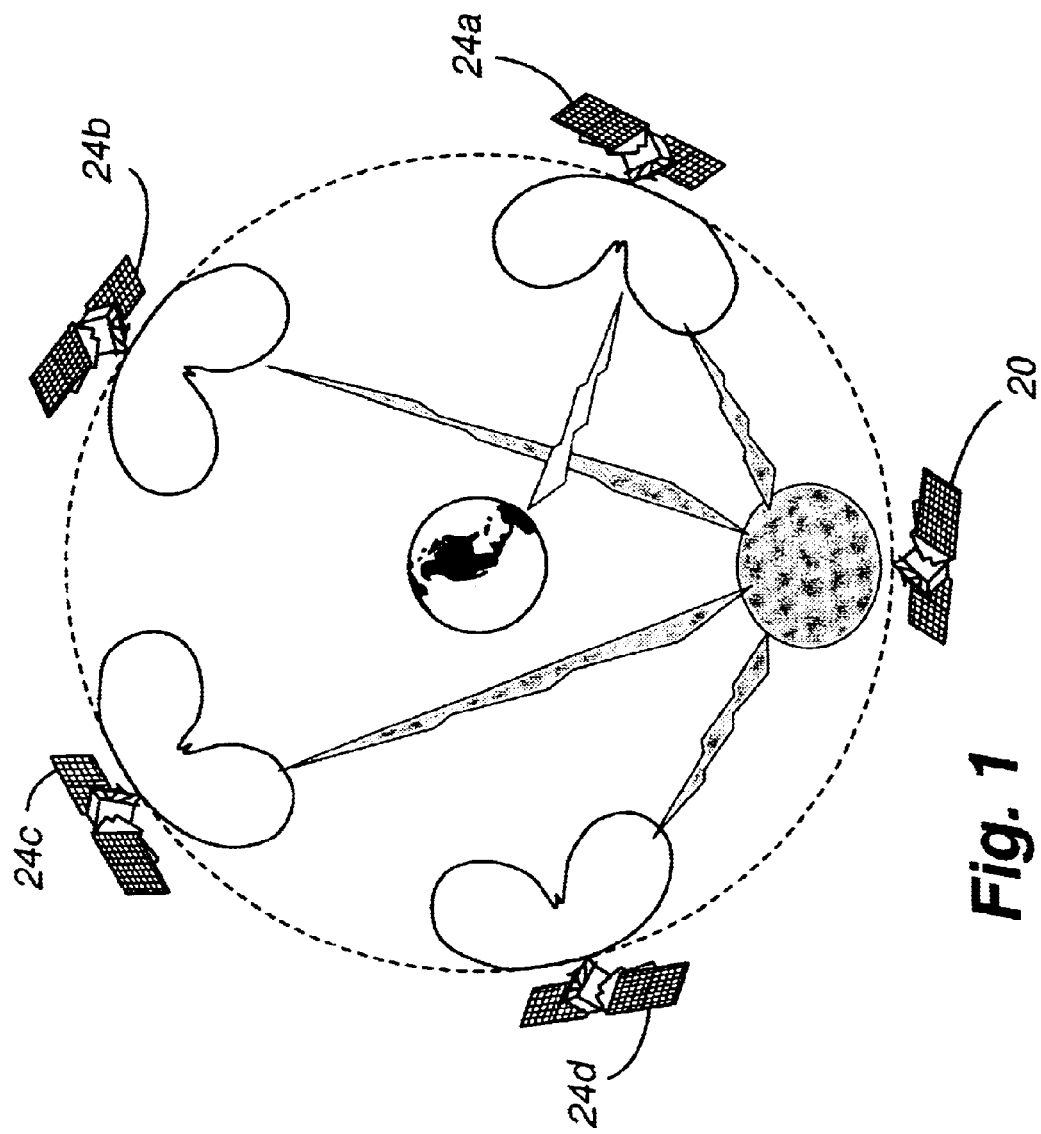
FIG. 1 diagrammatically illustrates the prior art cross-link system in which the same hemispherical receive pattern is employed by all beam receiving spacecraft to receive the transmit beam from the transmitting spacecraft.
Figure 2:
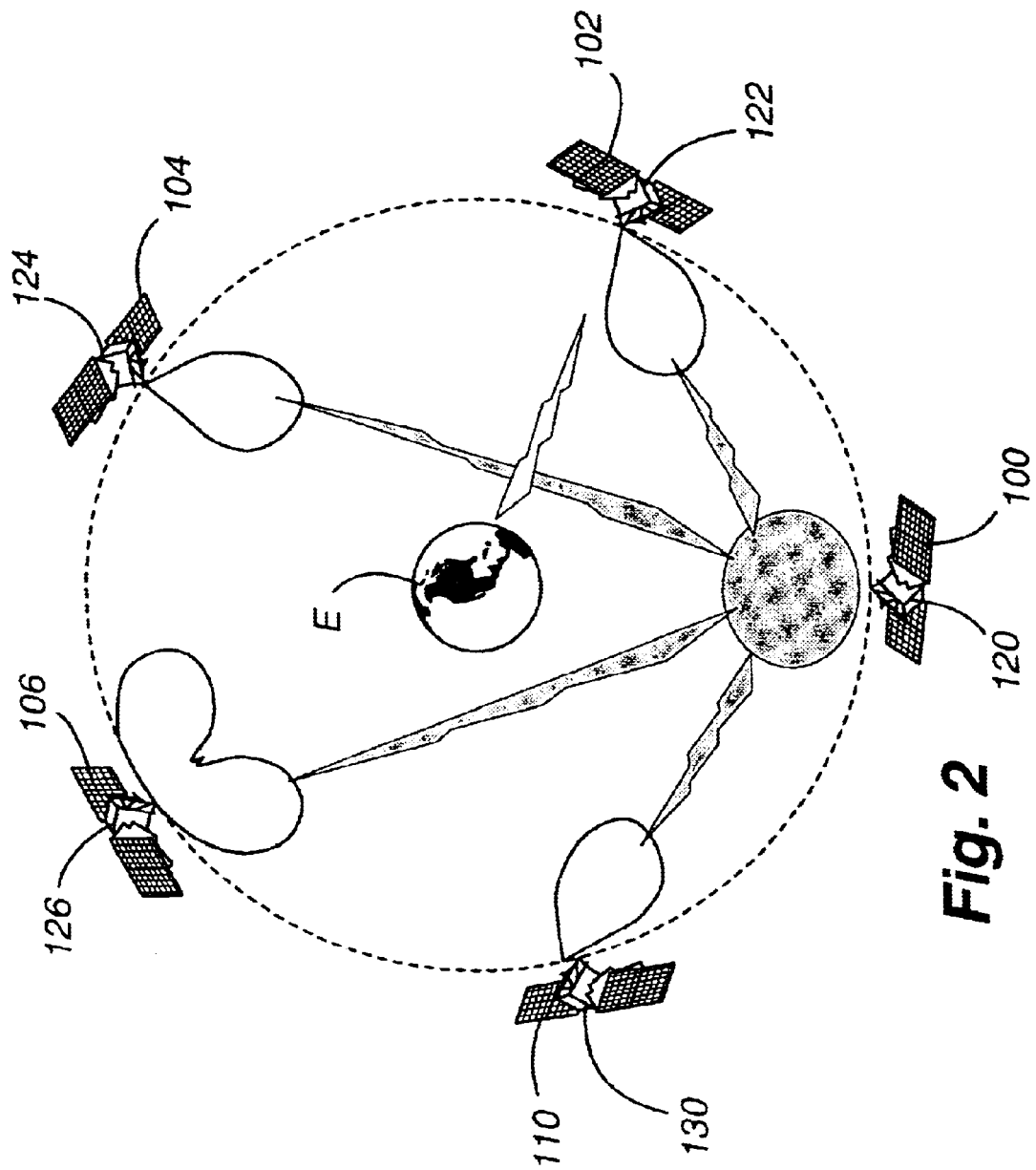
FIG. 2 diagrammatically illustrates the cross-link system of the present invention in which one or more spacecraft in the constellation generate a receive beam in the direction of the transmit beam.

With reference to FIG. 2, a constellation of a number of spacecraft 100, 102, 104, 106, 110 is diagrammatically illustrated. Each of the spacecraft 100–110 includes an antenna apparatus 120, 122, 124, 126, 130, respectively, which is capable of selectively generating a transmit beam or a receive beam. During certain predetermined time bins or intervals, one of the spacecraft 100–110 acts as a transmit spacecraft and each of the other spacecraft acts as a receive spacecraft.

One or more of the antennas apparatuses 120–130 is configured to generate a receive beam that is directed to the transmit spacecraft and its transmit beam. For another time interval, when there is a different transmit spacecraft, each of the one or more other spacecraft can generate their receive beams in the direction of the then current transmit spacecraft.

In the embodiment of the FIG. 2, five spacecraft are illustrated, although any number of spacecraft could be utilized. The five illustrated spacecraft 100–110 include the current transmit spacecraft 100 and the remaining four spacecraft 102, 104, 106, 110 that are in the process of receiving the transmit beam using their receive beams. Illustrated in the embodiment of FIG. 2 is the aspect that not all of the antenna apparatuses in the constellation need be configured to generate a directed receive beam. Prior art antenna apparatus with their associated spacecraft can also be included in the constellation. Such prior art spacecraft typically generate a fixed receive beam, such as a hemispherical pattern. In the embodiment of FIG. 2, the spacecraft 106 including its antenna apparatus 126 is not configured to be able to generate a directed receive beam. Instead, its receive beam is hemispherical in shape and has that same shape and direction, regardless of which of the other spacecraft is the current transmit spacecraft when the spacecraft 106 is in its receive mode. With respect to the other receive spacecraft 102, 104, 110, the antenna apparatuses 122, 124, 130 thereof can generate the desired, directed receive beam. As can be appreciated, such a receive beam is different from the hemispherical pattern and different from other, less directed beam patterns including omnidirectional patterns. FIG. 2 also illustrates diagrammatically the noise or other interference that can emanate from the earth (E) during any transmission by the current transmit spacecraft and the reception by the current receive spacecraft. The directed receive beams can be generated or controlled to at least significantly reduce the unwanted effects of such interference and, in some cases, minimize the effects of such interference.

Figure 3:
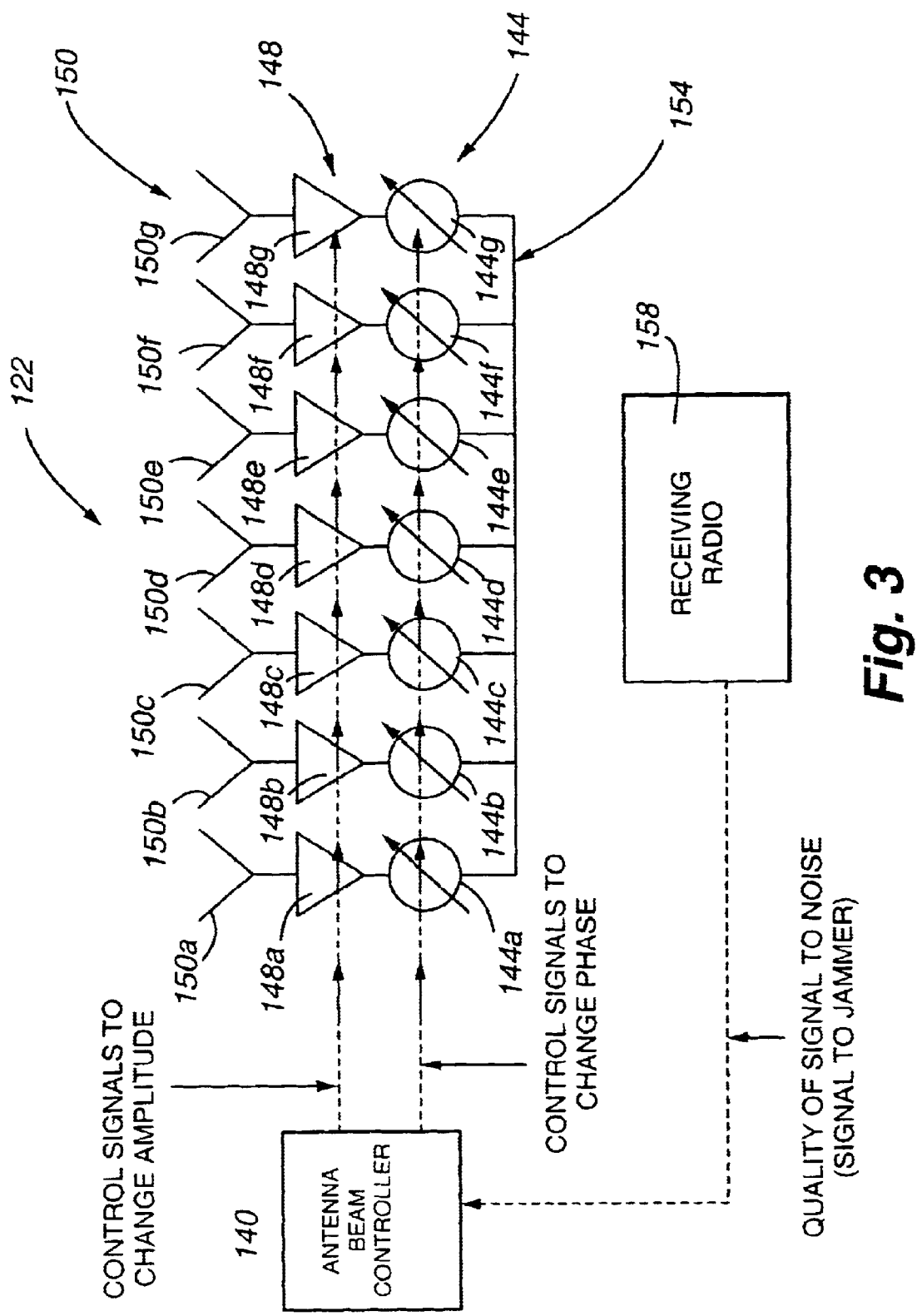
FIG. 3 illustrates a block diagram of major components of an antenna apparatus that is used with a spacecraft of the present invention.

Referring to FIG. 3, an antenna apparatus representative of at least antenna apparatuses 122, 124 and 130 is schematically depicted as including certain main components, for example, components of antenna apparatus 122. These components include an antenna beam controller 140 in electrical communication with phase shift circuitry 144 and a bank of low noise amplifiers (LNAs) 148. The LNAs 148 electrically communicate with a number of antenna or radiating elements 150. In this embodiment, the phase shift circuitry 144 has a number of phase shifters 144a–144g. One of the phase shifters 144a–144g is electrically associated with or dedicated to a different one of the LNAs 148a–148g. Each particular LNA 148a–148g is associated with or dedicated to a different one of the antenna elements 150a–150g. The combined outputs of the antenna elements 150 constitute or generate the directed receive beam for the antenna apparatus 122, when it is acting in its receive mode.

The antenna beam controller 140 includes at least one processor involved with one or more determining, processing and/or controlling functions related to outputting signals that control phases and amplitudes that are applied to or otherwise associated with the antenna elements 150. In that regard, the antenna beam controller 140 implements or processes one or more algorithms utilizing software in connection with outputting the desired control signals for a particular receive beam when a particular transmit beam is being received, such as generation of the receive beam by the antenna apparatus 122 when the current transmit antenna apparatus is antenna apparatus 120 of the spacecraft 100. These algorithms will be described later, particularly in conjunction with defining certain terms related to locations of the spacecraft 100–110 and, more particularly, in the context of the locations of one particular receive spacecraft and the current transmit spacecraft.

The representative antenna apparatus 122 also includes a combiner 154. In one embodiment, the combiner 154 communicates directly with the phase shift circuitry 144 and receives the amplified, phase-adjusted antenna element signals based on the receive beam. The combiner 154 combines or sums these antenna elements related signals. More particularly, the combiner 154 essentially provides a vectorial sum of the E fields associated with the antenna elements 150, as will be discussed further in conjunction with a more detailed description of its operation. The output of the combiner 154 is input to a receiving radio 158 that includes appropriate hardware and/or software useful in ascertaining the quality of the signal-to-noise (SNR) of the input combiner signal. This operation will also be further discussed later.

The antenna elements 150 are not limited in their design or configuration. The antenna elements 150 can be different radiators, for example, a combination of helix and microstrip patches. The antenna elements 150 can be oriented in different directions and can have different radiation patterns. In one embodiment, all the antenna elements 150 can be the same. In an even more specific, but illustrative only, embodiment the antenna elements 150 constitute an array of seven antenna elements as illustrated in FIG. 2.

Figure 4:
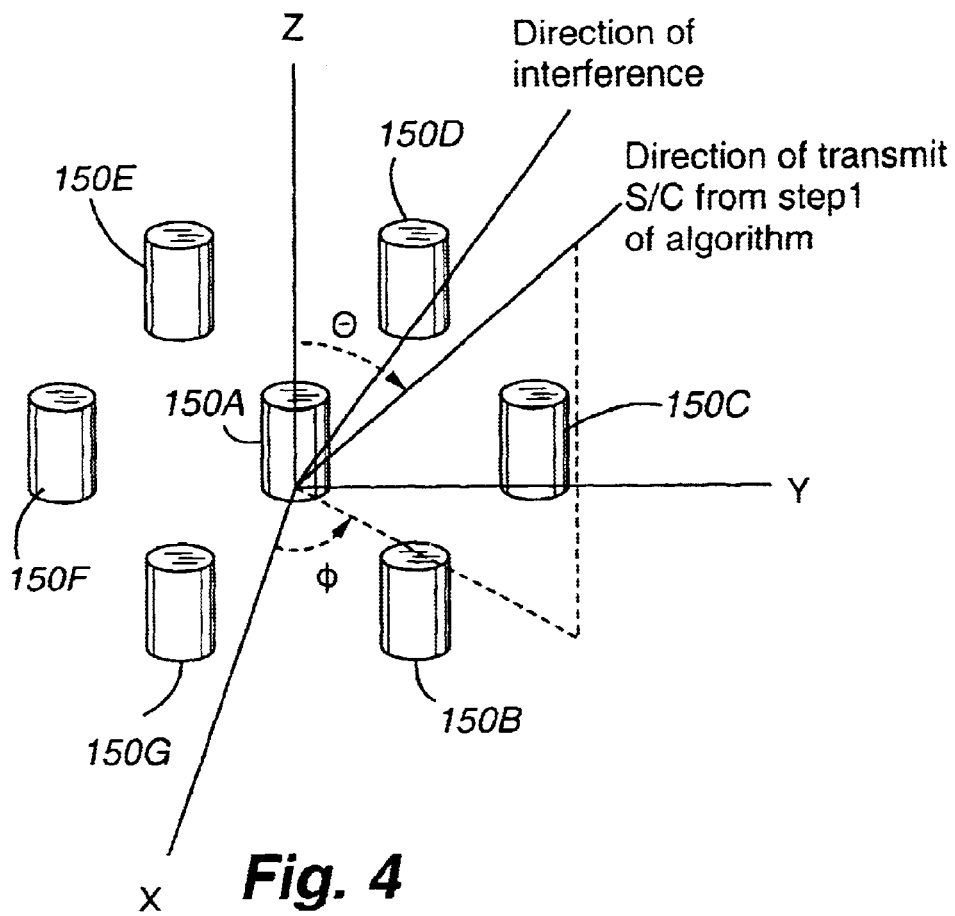
FIG. 4 diagrammatically illustrates locations of antenna elements in one embodiment of an antenna apparatus of the present invention.

With reference next to FIG. 4, an embodiment of seven antenna elements is schematically illustrated. In this embodiment, one of the antenna elements 150a is located substantially in the center of the array of antenna elements 150. The remaining six antenna elements 150b–150g are located radially substantially equidistant from the center antenna element 150a. Additionally, each of the radially outwardly located antenna elements 150b–150g is substantially equally spaced from each other at about 60° increments. Accordingly, each of the antenna elements 150b–150g, in this embodiment, can be characterized as being angularly displaced 60° from the antenna elements that are immediately adjacent to it. In one embodiment, the center of the receive beam can be characterized as emanating from the antenna element 150a located in the center of the antenna element array. In another embodiment, there is no antenna element in the center of the array. Rather, each of the antenna elements is disposed about or adjacent to a periphery, such as a circumference of a circle or an elliptical perimeter or any other geometric perimeter that is suitable. The algorithms used in determining location information will also take into account locations related to the antenna elements 150, which locations change relative to the earth, for example, during movement of the spacecraft (e.g. during its orbit and/or its attitude change).

The following description relates to the algorithms for achieving a controlled, directed receive beam in the direction of the current transmit beam. Important to the discussion is the need to obtain the locations of each spacecraft 100–110. Such locations are determined for each pair of spacecraft that is comprised of the same transmit spacecraft and a different one of the receive spacecraft. With respect to such location information, the following will be substantially directed to one pair of a transmit spacecraft and a receive spacecraft but with the understanding that it has applicability to the other pairs of transmit/receive spacecrafts.

It is well-known that each spacecraft in a constellation, such as each spacecraft of a GPS, can obtain the location of all other spacecraft in the constellation. Such location information, for example, can be continuously provided to the spacecraft from earth or a ground station, or directly from other spacecraft, or relayed from the earth via other spacecraft. Since the constellation is in a three dimensional space, such location information must be in a form that is three dimensional. Relatedly, such information is provided in a suitable coordinate system, such as a spherical coordinate system. In one embodiment, in defining the location of the spacecraft, angle information is obtained for the spacecraft in its azimuth plane and its elevation plane. The attitude of the receive spacecraft is also obtained in each of azimuth and elevation. As is also known, the attitude of the spacecraft can be defined along its yaw, pitch and roll axes. In one embodiment, the present invention takes into account attitude information in the yaw axis, while attitude information in the pitch and roll axes is negligible in the context of the determinations made related to providing the desired receive beam.

With respect to the location of the current transmit spacecraft in the azimuth plane, it is referred to or defined as Phi T1 (($\Phi_{T1}$) The location of the current transmit spacecraft is further characterized by its angle in the elevation plane, namely, Theta T1 ($\Theta_{T1}$) One of the receive spacecraft (e.g., a first receive spacecraft 102) receiving the transmit beam from the current transmit spacecraft 100 also has its location defined using angle information in azimuth and elevation. For the first spacecraft, its azimuth angle can be referred to as Phi R1 ($\Phi_{R1}$) Its elevation angle can be referred to as Theta R1 ($\Theta_{R1}$) In addition to these two angles in azimuth and elevation, the receive spacecraft (e.g., the first receive spacecraft 102) has an attitude angle in each of azimuth and elevation. The attitude angle of a first receive spacecraft (e.g., spacecraft 102) in azimuth is denoted or referred to as Phi Attitude ($\Phi_{A1}$) The attitude angle of this same spacecraft in elevation is denoted or referred to as Theta Attitude ($\Theta_{A1}$).

As can be appreciated, with respect to other receive spacecraft (second receive spacecraft . . . nth receive spacecraft), comparable values related to azimuth, elevation and attitude angles are obtained. Such values related to angles in azimuth can be referred to as $\Phi_{R2} \ldots \Phi_{Rn}$. Values related to angles in elevation for different receive spacecraft can be denoted or referred to as $\Theta_{R2} \ldots \Theta_{Rn}$. Values related to the attitude angles of the receive spacecrafts in azimuth and elevation can be referred to or denoted as: $\Phi_{A2} \ldots \Phi_{An}$ and $\Theta_{A2} \ldots \Theta_{An}$, respectively. Likewise, the values related to the angles of the transmit spacecraft in azimuth and elevation can be designated as $\Phi_{T2} \ldots \Phi_{Tn}$ and $\Theta_{T2} \ldots \Theta_{Tn}$, depending upon which spacecraft is the current transmit spacecraft. Consequently, for the current transmit spacecraft, each of the values related to the identified angles (e.g., $\Phi_{Tn}$, $\Theta_{Tn}$) are obtained.

After obtaining such values related to spacecraft locations in azimuth and elevation, a steering angle is calculated in each of the azimuth and elevation planes for each pair of the current transmit and a particular receive spacecraft. These first (azimuth) and second (elevation) steering angles are identified by the angles $\Phi$ and the $\Theta$. For a first receive spacecraft that generates a first receive beam based on the transmit beam from the current transmit spacecraft, these two steering angles can be referred to as $\Phi_1$ and $\Theta_1$. Each of $\Phi$ and $\Theta$ is a function of the values related to angles in the azimuth and elevation planes, respectively. More particularly, these relationships are defined as follows:

$\Phi=(\Phi_R-\Phi_T)-\Phi_A$; and $\Theta=(\Theta_R-\Theta_T)-\Theta_A$, where R refers to a receive spacecraft, T refers to the transmit spacecraft and A refers to the attitude of the receive spacecraft.

These calculated steering angles, for a particular pair of receive and transmit spacecrafts, are used with antenna element location information in connection with determining magnitudes of phase for each of the antenna elements in the array of antenna elements, such as phase values for seven antenna elements. The information related to location of the antenna elements in the antenna array is also used. This antenna element information used in determining phases includes a distance that a particular antenna element is from the center of the antenna element array and its orientation in the array, with the orientation being based on the previously described angular relationship of each of the antenna elements (e.g., each is 60° angularly displaced from its neighboring antenna element). With this information, phase values for energizing the antenna elements can be determined using the following relationships:

Phase 1 = d1 × sin ($\Theta$) × cos ($\Phi - \Phi$1) × 2π/λ

.          .
.          .
.          .

Phase n = dn × sin ($\Theta$) × cos ($\Phi - \Phi$n) × 2π/λ

The value d1 refers to the distance a first antenna element is from the center of the array. The angle $\Phi$1 refers to the angle of orientation that this particular antenna element has in the array. For example, in the case of the seven element array in which there is a center antenna element and the remaining six antenna elements are located essentially about the circumference of a circle, this angular value is one of 0°, 60°, 120°, 180°, 240° and 300°. The value of λ refers to the wavelength associated with the frequency being used in generating the receive beam. The magnitudes of $\Phi$ and the $\Theta$ are the steering angles that were calculated.

The phases associated with the antenna elements are determined using the algorithms based on the above-defined relationships. These determinations can be made by the one or more processors of the antenna beam controller 140. Based on such determinations, the antenna beam controller 140 outputs signals that control amplitudes and phases in connection with energization of the antenna elements 150a–150g. In particular, the phases that were determined for the number of antenna elements, such as the seven antenna elements array, are used in achieving proper phase energization of the seven antenna elements 150a–150g. Similarly, the control signal related to amplitude control of each of the antenna elements 150a–150g is output by the antenna beam controller 140 and applied to the amplifiers 148a–148g. In one embodiment, the outputs of the LNAs are controlled so that they are not saturated but close to saturation to achieve a high, desired amplification. When such control signals are applied, the receive antenna of the particular spacecraft that is generating the receive beam will have a maximum gain in the direction of the current transmit spacecraft. In the case of a first spacecraft 102 having a first antenna apparatus 122, this first antenna apparatus 122 will have maximum gain in the direction of the current transmit spacecraft 100 when this receive beam is generated as determined using the above-defined relationships.

In one embodiment, in conjunction with the foregoing determinations related to enhancing gain of the receive antenna apparatus, further processing is performed to determine a receive beam that minimizes, or at least significantly reduces, the effect that interference might have on the transmit beam currently being received using the determined receive beam. To achieve this reduced interference, it is desired that the vectorial sum of all fields associated with the antenna elements in the direction of the interference be minimized (null or substantially a null) or at least reduced, while the vectorial sum of all fields associated with the antenna elements in the direction of the transmit spacecraft be maximized, or at least enhanced or improved. In conjunction with achieving this desired minimization and maximization, variants of the phases and amplitudes previously determined or selected in maximizing the gain of the receive antenna are obtained and utilized. To obtain each such variant of the phase values (e.g., phase 1 . . . . phase 7), these previously determined phase values are modified by predetermined amounts or increments, such as a different incremental percentage or fixed magnitude changes that constitute increases and decreases in value from the previously determined phase values. The amplitudes used in arriving at the previously found maximum gain are varied as well. Each of these variants is used to provide a receive beam. Based on each such receive beam, a combiner signal results, which can be characterized as a vectorial sum of the fields of each of the antenna elements 150 in the antenna element array. The vectorial sum can be expressed as:

$E_{sum}=E_1+E_2+ \ldots E_n$ (in antenna elements), where $E_1=A_1 e^{j(phase\ 1)} \ldots E_n=A_n e^{j(phase\ n)}$ and in which j=complex operand, $\sqrt{j}-1$ and e=Euler's constant and $A_1$=amplitude 1 (amplitude of the first antenna element) . . . $A_n$=amplitude n (amplitude of the nth antenna element).

Figure 5:
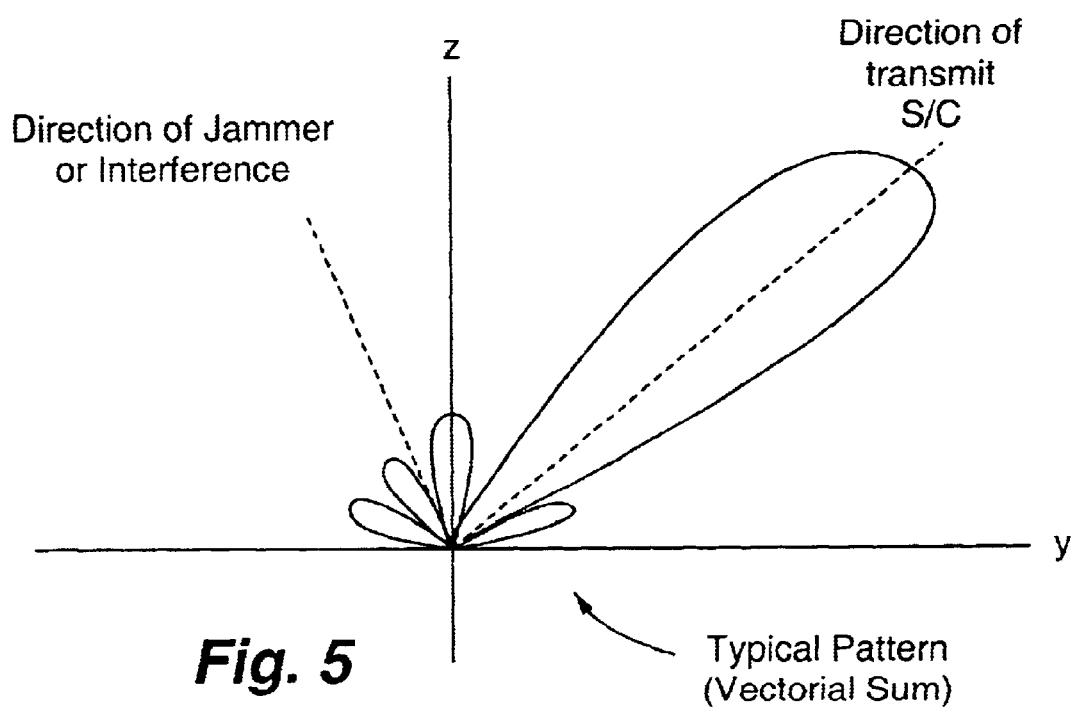
FIG. 5 is a diagram of a typical pattern of a receive beam illustrating a desired pattern portion (optimum gain) in the direction of a current transmit beam and another desired pattern portion (null) in the direction of interference.

This vectorial sum can also be expressed as:

$E_{sum}=[A_1 \cos (phase\ 1)+A_2 \cos (phase\ 2)+ \ldots]+j[A_1 \sin (phase\ 1)+A_2 \sin (phase\ 2)+ \ldots]$ In essence, the combiner 154, for each different generated receive beam based on a different variant, outputs a combiner signal which is indicative of such a vectorial sum. Referring to FIG. 5, a typical pattern of such a receive beam that also represents the vectorial sum of the E fields of the antenna elements is depicted. The objective is to determine those phases and amplitudes that maximize the gain in a direction of the current transmit spacecraft, while providing a null in the direction of interference. The evaluation that is conducted to accomplish this objective relates to an analysis of the combiner signal by the receiving radio 158. The analysis involves a determination of signal quality, namely, a determination for each receive beam with one or more different variants being analyzed and compared with other combiner signals to ascertain which thereof provides an optimum SNR. After each of the generated receive beams, based on each different variant or variants, has been used to develop a different combiner signal, the receiving radio 158 based on such analysis and comparisons can identify which of the combiner signals optimizes the SNR and inputs this information to the antenna beam controller 140. The antenna beam controller 140 can then use the phases and amplitudes for this optimum SNR to provide the optimum or desired receive beam, which has these properties or characteristics related to maximum or high gain for the receive antenna apparatus in the direction of the transmit spacecraft while providing a null or at least a reduction in noise in the direction of interference.

Other embodiments can be implemented related to generating a receive beam for a particular pair of a receive spacecraft and current transmit spacecraft. In one such other embodiment, the receive antenna gain in the direction of the current transmit spacecraft is determined as previously described, together with the gain of the same receive antenna but in the direction of a fixed location or locations on earth. The objective is to maximize, or at least enhance, the ratio of such a first antenna gain (in the direction of the current transmit spacecraft) to the second gain (in the direction of the fixed location(s)). Since the objective is to maximize or at least enhance the ratio of these two gains, it is desirable to achieve a null, or as close as possible to a null, in the direction of the fixed location(s). To determine phases and amplitudes for achieving this purpose, certain known information is utilized that includes the angle values associated with the known or fixed location(s), together with knowing that the vectorial sum of all antenna element fields should equal zero in the fixed location direction, or close thereto, in order that a null is provided in each such fixed location. Accordingly, the relationships and algorithms previously noted can be utilized with these known values to determine the phases and amplitudes that achieve the null in this desired direction, while maximizing, or at least enhancing, the antenna gain in the direction of the transmit spacecraft. Unlike the previously described embodiment, this embodiment has open loop characteristics in that no optimum determined SNR is found and used by the antenna beam controller 140 in connection with generating the desired or optimum receive beam. Instead, the appropriate calculations are performed using the one or more processors of the beam controller 140 based on such relationships and the known values related to the vectorial sum and the angle locations for the known, fixed location(s).

In an embodiment related to that which maximizes the ratio of the receive antenna gain to the gain in an arbitrary location (e.g., unknown location of noise or other interference), further steps can be performed that ascertain the location on earth of such interference. Using the information related to the determinations as to which phases and amplitudes result in a minimization or substantial reduction of the noise (null) in the receive beam, information can be ascertained, using the above-described relationships and algorithms, related to the location on earth at which the null, or substantially close thereto, is achieved.

Figure 6:
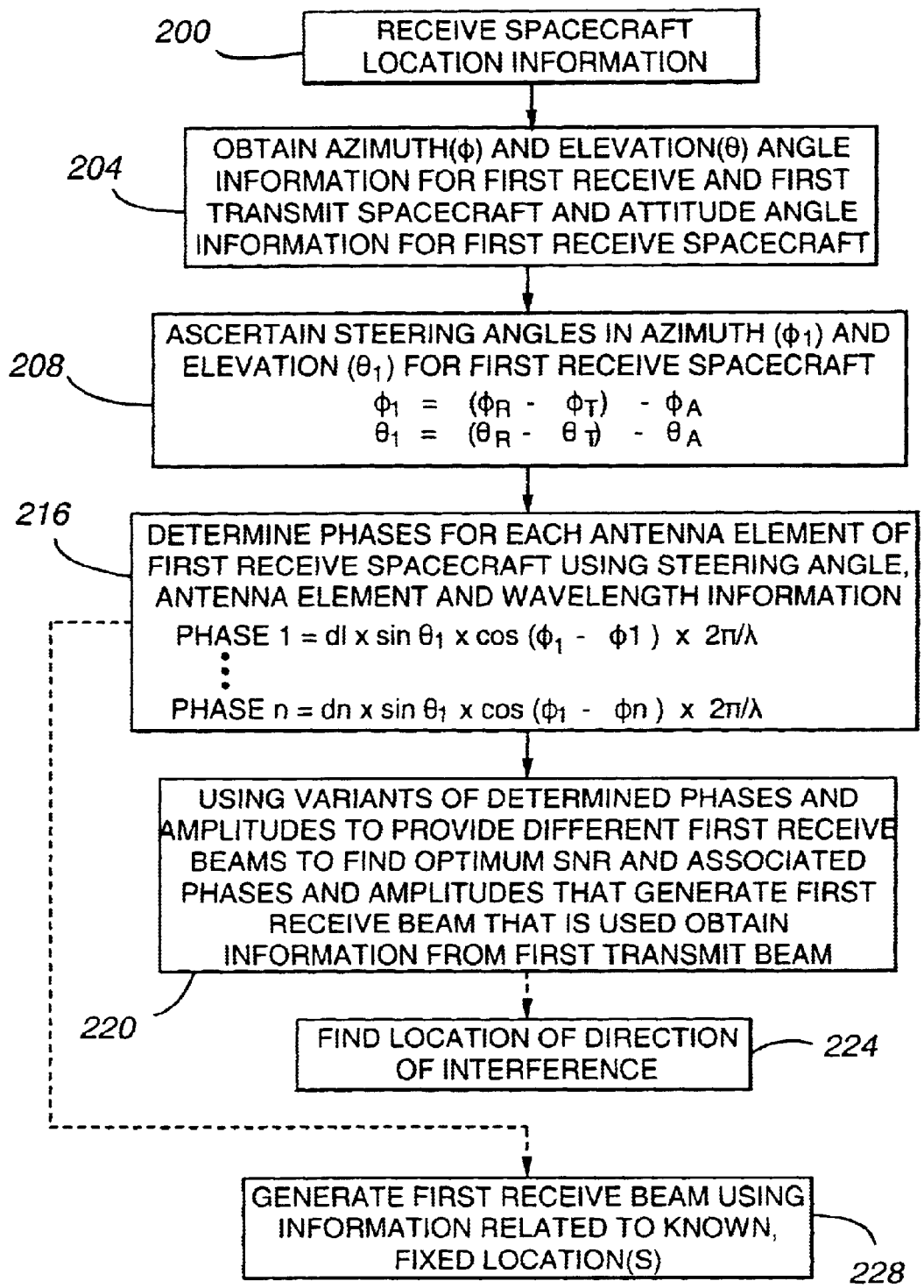
FIG. 6 is a flow diagram identifying major steps related to providing a desired receive beam.

With reference to FIG. 6, major steps or processes that relate to determining a first receive beam for a particular first receive spacecraft when it receives a first transmit beam from a first transmit spacecraft during a first time interval or bin are next described. The main steps or processes include, at block 200, commanding to each spacecraft 100–110 the locations of all other spacecraft in the constellation. Consequently, each of the first transmit spacecraft 100 and the first receive spacecraft 102 receive location information concerning where these two spacecrafts 100, 102 are located. In conjunction with such location information, at block 204, first and second values related to angle location information are obtained for each of the first transmit spacecraft 100 and the first receive spacecraft 102. The values related to such angle information define or characterize the positions of each of these two spacecraft in three dimensions. The two angles are in the azimuth and the elevation planes and for the receive spacecraft are identified as $\Phi_{R1}$ and $\Theta_{R1}$ and for the transmit spacecraft these are identified in the azimuth and elevation planes as the $\Phi_{T1}$ and $\Theta_{T1}$. Also obtained are the attitude values based on angles in azimuth and elevation for the first receive spacecraft 102. These two angles in azimuth and elevation are defined as $\Phi_{A1}$ and $\Theta_{A1}$, respectively. Although the attitude angle has three components in the yaw, pitch and roll axes, in most cases, the attitude angle is based essentially on the yaw axis.

At block 208, certain calculations are made to find the steering angle for each of azimuth and elevation and which steering angles in azimuth and elevation are defined for the first pair of first transmit spacecraft and first receive spacecraft as $\Phi_1$ and $\Theta_1$. The calculations that are made to ascertain these magnitudes are based on the relationships set out in block 208.

Next, at block 216, phase values are determined based on the steering angle magnitudes and the locations of the antenna elements 150a–150g in the antenna element array. A phase value is determined for each of the elements in the array, such as the seven antenna elements 150a–150g in one embodiment. Algorithms that are implemented for determining such phase values are identified in block 216. Such determined phase values are used by the beam controller 140 in providing control signals that can achieve these different phases by the respective antenna elements 150a–150g for the first receive spacecraft 102. The control signal(s) from the beam controller 140 that control the amplitudes of the LNAs 148a–148g communicating with the antenna elements 150a–150g are output to provide the desired amplification of the antenna signals received by the antenna elements 150a–150g in conjunction with the generation of the particular receive beam.

Instead of relying solely on the determined phase values and determined or selected amplitudes that result in a receive beam from the first receive antenna 122 having a maximum, or substantially maximum, gain in the direction of the first transmit spacecraft 100, block 220 can be performed that results in a determination of a receive beam that provides a substantial reduction or minimization of interference in the signals being received by the first receive antenna 122 using the determined receive beam. In connection with making these determinations related to noise or interference reduction, adjusted values or variants of the previously determined phase 1 ... phase 7 and amplitudes A1 ... A7 are utilized to change the receive beam. For each such change, the SNR (signal-to-noise ratio) is monitored or determined using the receiving radio 158 based on the combiner signal input thereto. Determinations or comparisons are made involving all the SNR values that are found. Based on such analysis, a determination is made as to which phase and amplitude values optimize, or at least substantially enhance, the SNR. The phase values and amplitudes that provide this desired ratio are used in generating the receive beam by the first receive antenna 122.

A further process could be performed at block 224 related to making determinations regarding the location on earth of the source of noise or other interference that was found to exist during the analysis using the variant phase values and amplitude values. The phases and amplitudes that resulted in the lowest SNR, for example, can be employed, using the relationships and algorithms that were utilized in ascertaining the maximum gain related phases, in determining the location on the earth from which such noise or other interference emanated. That is, instead of the location of interference being known, the initially determined phases and amplitudes or later determined variant(s) thereofare known and these known values can be used with such relationships and algorithms to solve for the unknown azimuth and elevation angles that can be used to define the location or direction of the noise.

In another embodiment, instead of performing the step associated with block 220, the process of block 228 is conducted. In performing this option, a known location or locations on the earth is designated for which the first antenna apparatus 112 is to direct a null or substantially a null. With this embodiment, the previously described relationships and algorithms including those related to the vectorial sum of the fields of the antenna elements can be utilized. In particular, the vectorial sum of the E fields in the known or fixed location(s) should equal zero, or substantially close thereto, in order to achieve a null. This known information, together with other known or determined information such as related to the known locations for the transmit and receive spacecraft, can be incorporated with these relationships and algorithms to obtain the phases and amplitudes of the antenna elements that result in such a null.

The foregoing discussion of the invention has been presented for purposes of illustration and description. The description is not intended to limit the invention to the form disclosed herein. Variations and modifications commensurate with the above teachings, within the skill and knowledge of the relevant art, are within the scope of the present invention. For example, the number of antenna elements can be greater or fewer than seven antenna elements, such as five antenna elements or nine antenna elements. However, to better achieve the advantages of the present invention, it is preferred that the number of antenna elements be greater than three. Additionally, it appears that is not cost effective if more than nine antenna elements are utilized. With respect to the number of variants in determining an optimized or desired SNR, the number of variants should not be so great that the time to make the determinations using such variants exceeds the time being utilized by the particular, determined receive beam in obtaining desired information. Generally, such determinations using a number of variants should be substantially less than the time actually used by the receive beam to obtain desired information and at least less than 10% of the time being used by the receive beam to obtain the desired information. The embodiments discussed hereinabove are further intended to explain the best mode known of practicing the invention and to enable others skilled in the art to utilize the invention in such, or in other, embodiments and with the various modification(s) required by the particular application or use of the invention. It is intended that the appended claims be construed to include alternative embodiments to the extent permitted by the prior art.

What is claimed is:

1. A method for receiving beams by a plurality of spacecraft, comprising:
   providing a plurality of spacecraft including at least a first and second transmit spacecraft and at least first and second receive spacecraft, said first receive spacecraft having a first antenna with a number of antenna elements including at least a first antenna element and said second receive spacecraft having a second antenna with a number of antenna elements including at least a first antenna element;
   sending a first transmit beam by said first transmit spacecraft during a first time interval in a direct way to at least said first receive spacecraft;
   controlling a first receive beam in a determined first direction that depends on said first transmit beam using at least said first antenna element of said first antenna and controlling a second receive beam in a determined second direction that depends on said first transmit beam using at least a first antenna element of said second antenna;
   sending a second transmit beam by said second transmit spacecraft during a second time interval in a direct way to at least said first receive spacecraft; and
   controlling a third receive beam in a determined third direction that depends on said second transmit beam using at least a second antenna element of said first antenna and controlling a fourth receive beam in a determined fourth direction that depends on said second transmit beam using at least a second antenna element of said second antenna said third direction being different than said first direction, said fourth direction being different than said second direction and each of said first, second, third and fourth directions being different than hemispherical and omnidirectional patterns.

2. A method, as claimed in claim 1, wherein:
   said step of controlling said first receive beam and said step of controlling said second receive beam are conducted during substantially the same time.

3. A method, as claimed in claim 1, wherein:
   said step of controlling said first receive beam includes making determinations related to gain for said first antenna.

4. A method, as claimed in claim 1, wherein:
   said step of controlling said first receive beam includes determining information related to phases that depend on angles of said number of antenna elements for said first antenna including information related to a first phase associated with a first angle of said first antenna element of said first antenna.

5. A method, as claimed in claim 4, wherein:
   said step of controlling said first receive beam includes using said information related to phases in obtaining a desired gain for said first antenna.

6. A method, as claimed in claim 1, wherein:
   said step of controlling said first receive beam includes obtaining a first attitude value related to a first attitude angle associated with said first receive spacecraft.

7. A method, as claimed in claim 6, wherein:
   said step of controlling said first receive beam includes obtaining a first receive value related to a location of said first receive spacecraft and obtaining a first transmit value related to a location of said first transmit spacecraft and ascertaining a first magnitude related to a first steering angle using said first receive value, said first transmit value and said first attitude value.

8. A method, as claimed in claim 7, wherein:
   said step of controlling said first receive beam includes obtaining a second attitude value related to a second attitude angle associated with said first receive spacecraft, obtaining a second receive value related to said location of said first receive spacecraft, obtaining a second transmit value related to said location of said first transmit spacecraft and ascertaining a second magnitude related to a second steering angle using said second receive value, said second transmit value and said second attitude value.

9. A method, as claimed in claim 1, wherein:
   said first antenna element is located a first distance from a center of said number of antenna elements of said first antenna and said step of controlling said first receive beam includes determining information related to phase using at least said first distance.

10. A method, as claimed in claim 1, wherein:
    said step of controlling said first receive beam includes determining at least a first phase and in which said determining step includes using a first distance related to a distance of said first antenna element of said first antenna from a center of said number of antenna elements of said first antenna, using a first magnitude related to a first steering angle that depends on first angle locations for each of said first receive spacecraft and said first transmit spacecraft and a first attitude value related to a first attitude angle associated with said first receive spacecraft, using a first antenna element angle related to said number of antenna elements of said first antenna and using a second magnitude related to a second steering angle that depends on second angle locations for each of said first receive spacecraft and said first transmit spacecraft and a second attitude value related to a second attitude angle associated with said first receive spacecraft.

11. A method, as claimed in claim 1, wherein said step of controlling said first receive beam includes one of:
making determinations related to a gain of said first antenna in the direction of said first transmit spacecraft;
making determinations related to a ratio of a gain of said first antenna in the direction of said first transmit spacecraft to a gain in a direction of at least a first fixed location; and
making determinations related to a ratio of a gain of said first antenna in the direction of said first transmit spacecraft to a gain in a direction of an unknown location.

12. A method, as claimed in claim 1, wherein:
said step of controlling said first receive beam includes adjusting at least phases related to said antenna elements of said first antenna and providing a combiner signal related to a first vectorial sum of fields of said antenna elements of said first antenna at least in the direction of said first transmit spacecraft.

13. A method, as claimed in claim 1, wherein:
said step of controlling said first receive beam includes determining at least a plurality of phases related to said number of antenna elements using location information for each of said first transmit spacecraft and said first receive spacecraft.

14. A method, as claimed in claim 13, wherein:
said step of controlling said first receive beam includes using variants of at least said plurality of phases to provide a number of first receive beams and conducting analysis related to signal-to-noise ratios based on said variants.

15. A method, as claimed in claim 14, wherein:
said step of controlling said first receive beam includes inputting information to an antenna beam controller related to an optimum of said signal-to-noise ratios.

16. A system for sending a transmit beam to be received by a plurality of spacecrafts, including:
a first transmit spacecraft having a first transmit antenna that sends a first transmit beam;
a second transmit spacecraft having a second transmit antenna that sends a second transmit beam:
a first receive spacecraft having a first receive antenna that generates a determined first receive beam that depends on said first transmit beam when said first transmit beam is sent in a direct way to it and that generates a determined third receive beam that depends on said second transmit beam, said third receive beam having a direction different than said first receive beam;
a second receive spacecraft having a second receive antenna that generates a determined second receive beam that depends on said first transmit beam and that generates a determined fourth receive beam that depends on said second transmit beam when said second transmit beam is sent in a direct way to it, said fourth receive beam having a direction different than said second receive beam, wherein each of said directions of said first, second, third and fourth receive beams being different than hemispherical and omnidirectional patterns.

17. A system, as claimed in claim 16, wherein:
said first receive antenna has a center and a number of antenna elements including at least a first antenna element that is located a first distance from said center and in which said first receive beam is generated using at least said first antenna element.

18. A system, as claimed in claim 16, wherein:
said first receive beam is determined depending on a location of said first receive spacecraft and a location of said first transmit spacecraft and said second receive beam is determined depending on a location of said second receive spacecraft and said location of said first transmit spacecraft.

19. A system, as claimed in claim 16, wherein:
said first receive beam depends on at least one of a gain of said first receive antenna and a direction of interference.

20. A system, as claimed in claim 19, wherein:
said gain is related to at least a first phase that is a function of a number of parameters including a first distance based on a distance between a first antenna element of said first receive antenna of said first receive spacecraft and a center of a number of antenna elements that include said first antenna.

21. A system, as claimed in claim 16, wherein:
said determined first receive beam depends on first and second angles related to a location of said first receive spacecraft.

22. A system, as claimed in claim 21, wherein:
said determined first receive beam depends on first and second attitude angles of said first receive spacecraft.

23. A system, as claimed in claim 22, wherein:
said determined first receive beam depends on first and second angles related to a location of said first transmit spacecraft.

24. A system, as claimed in claim 23, wherein:
said first receive antenna has a number of antenna elements including a first antenna element that are spaced from each other and said determined first receive beam depends on an angle associated with at least said first antenna element.

25. A system, as claimed in claim 16, wherein:
said first receive antenna is comprised of a number of elements including first and second antenna elements and said second receive antenna is comprised of a number of antenna elements including a first antenna element corresponding to said first antenna element of said first antenna and a second antenna element corresponding to said second antenna element of said first antenna and in which said first receive beam is generated using at least said first antenna element and not using said second antenna element and said second receive beam is generated using said second corresponding antenna element and not using said first corresponding antenna element.

26. A system, as claimed in claim 16, wherein:
said first receive beam is different from each of a hemispherical patterned beam and a spherical patterned beam.

27. A system, as claimed in claim 16, wherein:
said plurality of spacecraft include a third receive spacecraft that generates a third receive beam that is independent of location of said first transmit beam and in which said first receive beam has a different direction from said second receive beam and each of said first and second receive beams are dependent on location of said first transmit beam.

28. A system, as claimed in claim 16, wherein:
said first receive beam includes a patterned portion that depends on at least one known location different from locations of said plurality of spacecraft.

* * * * *